(No Model.)
J. ULRICH.
FARM GATE.
No. 314,756. Patented Mar. 31, 1885.
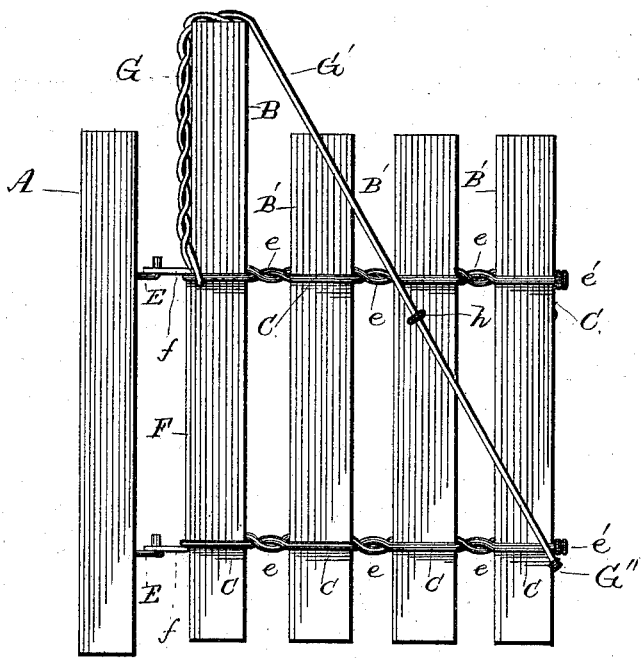
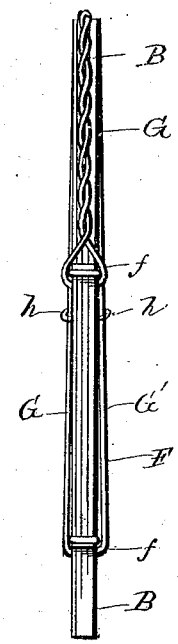
WITNESSES
Edwin L Bradford
Morton Toulmin
INVENTOR
Jacob Ulrich
By Jos H Hunter
Attorney

UNITED STATES PATENT OFFICE.

JACOB ULRICH, OF HUNTINGTON, INDIANA.

FARM-GATE.

SPECIFICATION forming part of Letters Patent No. 314,756, dated March 31, 1885.

Application filed May 5, 1884. (No model.)

*To all whom it may concern:*

Be it known that I, JACOB ULRICH, a citizen of the United States, residing at Huntington, in the county of Huntington and State of Indiana, have invented certain new and useful Improvements in Farm-Gates, of which the following is a specification, reference being had therein to the accompanying drawings.

This invention relates to improvements in farm and yard gates, and has for its objects, first, to construct a gate in which the pickets forming the panels of the gate are secured to the gate-frame by means of loops formed by twisting two parallel wires together; secondly, to utilize the wires which hold the pickets of the gate in relative positions as a means whereby the plate forming the gate-hinge may be securely fastened thereto; thirdly, to form a diagonal brace of twisted wires, whereby the upper wires of the gate and the upper part of the hinge are more securely held in their proper position and the gate is prevented from sagging. These objects are attained by the devices illustrated in the accompanying drawings, forming a part of this specification, in which—

Figure 1 a side elevation of a gate. Fig. 2 is a view of that part of the gate next the gate-post, and shows the hinge and the means of securing it to the gate.

The letter A indicates a gate-post. B is a long picket, and answers the purpose of one of the frame-pieces of a gate, and B' are the gate-pickets. C are wires which are doubled over a metal plate, F, having lugs $f$, which form the hinges to the gate. These wires are then carried on each side of the picket B and twisted at $e$, then on each side of each succeeding picket and twisted between each two pickets at $e$ until the whole are secured to each other by the final twist at $e'$. The wire G is doubled, and thus formed into a loop under the upper wire, C, and between the plate F and the picket B. This wire is then twisted in a rope-like form and passed over the top of the picket B, and rests in a notch in the top thereof. The two parts of the wire are then carried down, one on each side of the gate and through staples $h$ to the lower part of the gate, and there twisted together, thus forming a brace to support the weight of the gate, and at the same time to maintain the wires C and hinges F in their proper positions.

E are hooks, of the usual form, attached to the gate-post for the purpose of hanging the gate.

I am aware that farm-gates have been made of wire attached to vertical pickets composing the frame by means of staples, as shown in Patent No. 223,520, granted to D. C. Kinsell, January 13, 1880. I do not claim, broadly, such construction; but, Having described my invention, what I do claim, and desire to secure by Letters Patent, is—

A farm or yard gate having a long picket, B, notched at the top, short pickets B', and hinge-plate $f$, held together by upper and lower horizontal wires, C, twisted together at $e$ and $e'$, in combination with a diagonal wire brace twisted over the upper wires, C, carried over the top of long picket and said notch, and downwardly in two parts, one of which on each side of said short pickets passes through staples $h$, the parts being then twisted together at G'', as described, and for the purposes set forth.

In testimony whereof I affix my signature in presence of two witnesses.

JACOB ULRICH.

Witnesses:
J. G. AMISS,
M. L. SPENCER.